March 29, 1932.   B. N. KNOCHE   1,851,314
SPOOL FOR THREAD
Filed May 25, 1929
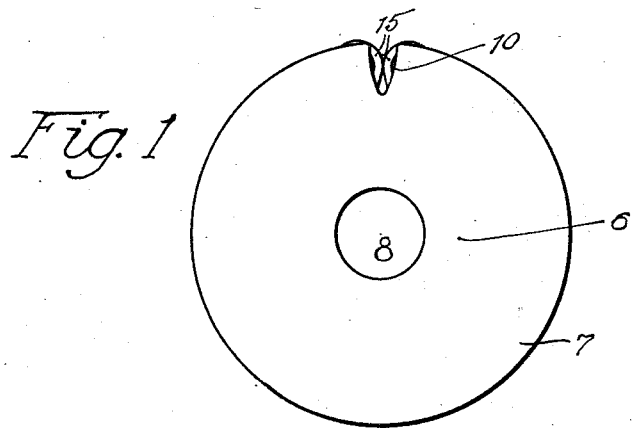
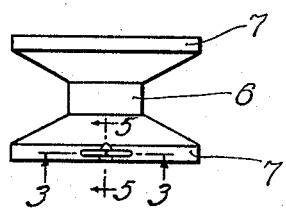 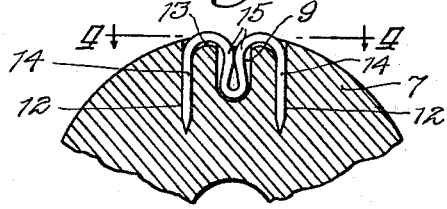
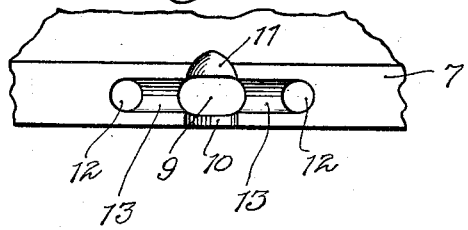 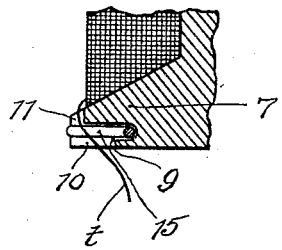
Inventor
Bernhard N. Knoche
By Brown, Jackson, Boettcher & Dienner
Attys.

Patented Mar. 29, 1932

1,851,314

UNITED STATES PATENT OFFICE

BERNHARD N. KNOCHE, OF BALDWIN, NEW YORK, ASSIGNOR TO BELDING-HEMINWAY COMPANY, OF NEW YORK, N. Y., A CORPORATION OF CONNECTICUT

SPOOL FOR THREAD

Application filed May 25, 1929. Serial No. 365,907.

My invention relates to spools for thread and contemplates improved means for holding the free end of the thread against unintentional unwinding.

According to my invention I mount a specially formed staple in the flange of the spool and this staple acts as a thread holding means.

My invention is illustrated in the accompanying drawings, in which:

Figure 1 is an enlarged end view of a spool embodying my invention;

Figure 2 is an elevational view thereof on a smaller scale;

Figure 3 is an enlarged fragmentary sectional view, taken on the plane of the line 3—3 of Figure 2 and looking in the direction indicated by the arrows;

Figure 4 is an enlarged fragmentary view taken on the plane of the line 4—4 of Figure 3 and looking in the direction indicated by the arrows; and Figure 5 is an enlarged fragmentary sectional view taken on the plane of the line 5—5 of Figure 2 and looking in the direction indicated by the arrows.

The spool, of wood, comprises the barrel 6 having the flanges 7, 7 and the central bore 8. One of the flanges is provided with a socket 9 leading radially toward its center from the periphery, the outer wall of the socket being notched out almost to its depth, as indicated at 10, and the inner wall of the socket being notched out slightly, as indicated at 11. At each side of the socket 9 small bores 12, 12, parallel to its axis, are provided, and peripheral grooves 13, 13 connect the socket with the bores.

The specially formed staple, of wire, is clearly shown in Figure 3. Its shanks 14, 14 fit down into the bores 12, 12 and its bight portion is looped centrally downward as indicated at 15, this loop extending down into the socket 10 and the divided bight portions lying in the grooves 13, 13. The pointed shanks of the staples may permit their being driven in the flange without first boring the holes 12, 12 to receive them.

As clearly shown in Figure 1, the outer notch 10 in the flange 7 exposes the looped portion of the staple and the free end of the thread $t$, as shown in Figure 5, is passed through notch 11, into loop 15, and then through notch 10, as shown.

The staple lies entirely or substantially entirely within the conventional contour of the spool and it is so supported that the flexing permitted the looped central portion enables the free end of the thread to be caught therein, held thereby, and released, as desired.

I claim:

1. In a spool for thread, a staple secured in the spool and having a central portion looped between its shanks for the reception of the free end of the thread.

2. A spool comprising a body with a flange at each end, one of the flanges having a notch therein, and a staple secured in said flange having a thread engaging portion disposed in alignment with said notch.

3. A spool comprising a barrel and a flange having a socket therein opening at its periphery and notched outwardly, and a staple in said flange having a portion thereof looped to form a thread holding means and disposed in said socket.

4. A spool comprising a barrel and a flange on each end thereof, one of the flanges having staple receiving openings in the periphery thereof and a socket between said openings, a staple disposed in said openings and having a thread engaging loop extending into said socket, said flange having a notch therein exposing said loop.

5. A spool comprising a barrel and a flange on the end thereof, said flange having a peripheral notch, and a wire thread engaging loop disposed within said notch.

In witness whereof, I hereunto subscribe my name this 16th day of May, 1929.

BERNHARD N. KNOCHE.